May 17, 1938. M. F. RICHARDSON 2,117,504
GROUP VALVE UNIT
Original Filed Sept. 28, 1935
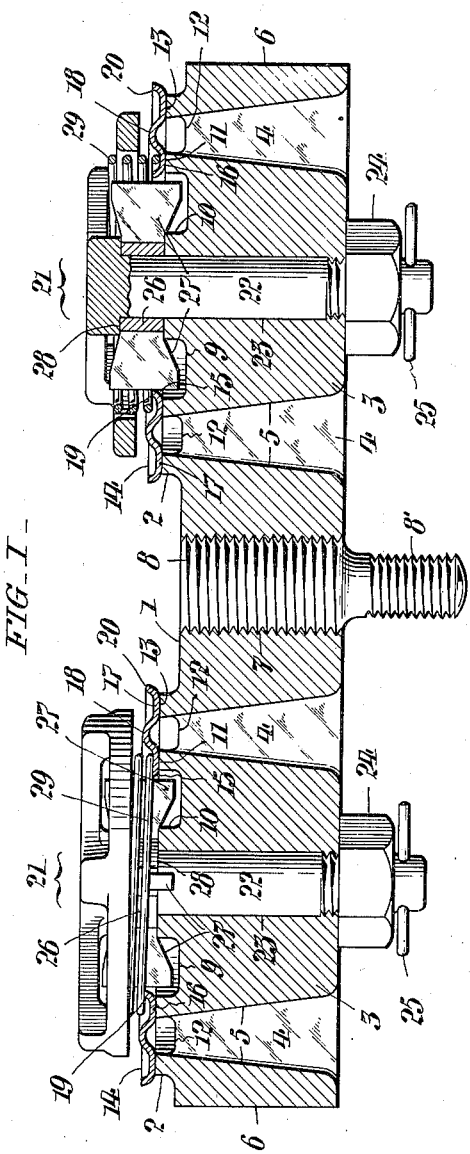
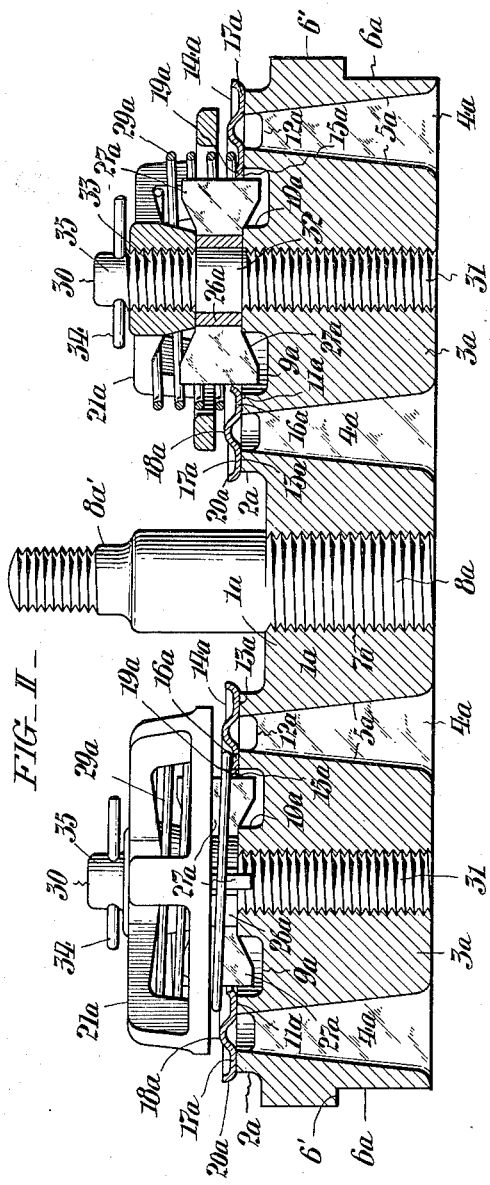
INVENTOR:
Maurice F. Richardson,
BY
ATTORNEYS.

Patented May 17, 1938

2,117,504

UNITED STATES PATENT OFFICE 2,117,504

GROUP VALVE UNIT

Maurice F. Richardson, Berwyn, Pa.

Original application September 28, 1935, Serial No. 42,576, now Patent No. 2,090,486, dated August 17, 1937. Divided and this application April 19, 1937, Serial No. 137,649

3 Claims. (Cl. 251—119)

This invention relates to group valve units such as are used in pumps and compressors, and, more particularly, to those subject to heavy duty; while the instant application is a division of my Patent No. 2,090,486, filed September 28, 1935, and issued August 17, 1937.

The primary object of this invention is the provision of a valve unit of the indicated type characterized by maximum flow-passage for the gas, air or liquid, whereby the capacity of such units is greatly increased without impairment of their efficiency.

Another object is to furnish a group valve unit of the indicated class which embodies structural refinements conducive to increased durability.

The stated and other objects of this invention will be set forth in the following specification, reference being made to the accompanying drawing, and the novel means by which the stated objects are attained is more specifically expressed in the claims.

In the drawing:

Fig. I is an axial section of a group valve intake unit embodying this invention; and, Fig. II is a similar section of a group-valve discharge unit.

Referring more in detail to the drawing, in both views whereof corresponding parts are designated by the same or similar reference characters, the group valve unit illustrated comprises a head or disc member 1 provided with any desired number of suitably ported seats or sections 2, said seats each including a central boss or hub-like portion 3 with connecting arms 4 to define tapering flow-passages 5 therethrough. The head or disc member 1 may be formed with a smooth periphery 6 as shown in Fig. I, or it can be provided with a stop shoulder 6' as in Fig. II; both types, however, being adapted for forced-fit engagement in complemental apertures through a conventional partition or pump-chest deck, not shown, or elsewhere as desired. The head or disc member 1 is also axially bored at 7 for reception of a screw-threaded securing-stem 8, the projecting portion whereof is reduced in diameter and screw threaded at 8'.

Each ported seat 2 is concentrically grooved at 9 to define a central embossment 10, and an inner annular seating-surface 11; while the arms 4 are preferably inset at 12, and the member 1 upper surface is suitably reduced to define coaxially related outer annular seating-surfaces 13.

The valve discs 14 are suitably formed of sheet metal to each embody an axial orifice 15, as well as concentric inner and outer seating portions 16, 17, respectively, for coaction with the disc member annular surfaces 11, 13, said seating portions being separated by an intervening arched ridge 18; while the inner and outer peripheral edges of the valve discs 14 are preferably flared as shown at 19, 20 to ease operation of the valve.

The valve stop means or guard 21 embodies a stem 22 which passes through an axial bore 23 in each seat hub-like portion 3 for application of a lock nut 24 and cotter pin 25. It is to be observed the guard 21 is comparatively shallow in depth, and that the stem 22 thereof is suitably fashioned for free reception of a centrally-bored removable spider or valve guide element 26 embodying radial arms 27 that diverge longitudinally outwards relative to the cylindrical ends of said element. This guide element 26, it is to be remarked, serves as a jamb means intermediate a shoulder 28, at the top of the stem 22, and the ported seat central embossment 10, for rigidly securing the stop means or guard 21 to the head or disc member 1, in an obvious manner. Furthermore, the radial arms 27 are preferably convergently-tapered outwards to facilitate flow through the valve. Each valve disc 14 is normally held seated by a suitable spring 29 intermediate said disc and the inner underside of the stop means or guard 21, in an obvious manner.

In Fig. II, which shows a group valve discharge or pressure-responsive unit, parts corresponding to those previously described are characterized by like reference numerals, with the added exponent "a", to avoid unnecessary repetitive description. It is to be observed, however, that the unit securing stem 8a is threadedly engaged in the axial bore 7a of the disc member 1a, extended upwardly and reduced at 8a'. The valve stems are preferably in the form of headless screws 30, each embodying a lower portion 31 for threaded engagement in the disc member boss or hub-like portions 3a, an intermediate plain portion 32 for reception of the removable valve guide element 26a, and an upper screw-threaded section 33, to which the stop means or guard 21a is removably and threadedly-applied. A diametric cotter pin 34 engages through the reduced terminal end 35 of the stem 30 for locking the parts just described, in assembled relation, as well as serving to prevent any "backing-up" of the guard 21a in respect to the valve discs 14a.

From the foregoing it will be readily understood that in group valve units as described, whether the valve discs 14, 14a be moving slowly or rapidly, there will always be a maximum uninterrupted flow of the gas, air or liquid therethrough around both the inner as well as the outer flared edges 19, 19a and 20, 20a, respectively, incidental to provision of the free passages afforded intervening the guide radial arms 27, 27a, in addition to formation of the stop means or guards 21, 21a, as spider-like structures. Furthermore, the free flow being directed radially, it will be apparent that a maximum volume of the gas, air or liquid passes the valve, with each "pulsation" thereof.

Finally, it is to be understood the precise inventive ideas set forth may be varied without departure from the scope of the invention, as more concisely expressed in the following claims.

Having thus described my invention, I claim:

1. In a group valve set comprising a discous member with a central securing stem and plural ported-seat sections in a common plane, an individual spring-influenced axially apertured valve disc for each seat section, a spider like stop structure including an annular guard ring with an axial stem for its attachment centrally of said seat section, and an abutment shoulder inset relative to the annular guard ring, a removable guide member having radial arms and an axially apertured portion for engagement on the stop structure stem intermediate the abutment shoulder and the central part of the ported-seat section, said removable guide member radial arms diverging relative to the ends of its axially apertured portion, and the ported-seat section being annularly grooved to accommodate the lower divergent edges of the guide member radial arms.

2. A group valve intake set as defined in claim 1 wherein the stop structure stem passes through an axial bore in the seat section, and its free end is screw-threaded and diametrically apertured for the application of a lock nut and cotter pin respectively.

3. A group valve discharge set as defined in claim 1, wherein the stop structure stem is in the form of a headless screw with an intermediate plain portion for application of the removable guide member, one portion of said screw being arranged for threaded engagement axially into the ported-seat section, and the other screw portion having its outer end reduced and diametrically bored for a cotter pin to prevent "backing-off" of the stop structure.

MAURICE F. RICHARDSON.